(12) United States Patent
Weindorf

(10) Patent No.: US 11,517,836 B2
(45) Date of Patent: Dec. 6, 2022

(54) FILTER ELEMENT WITH VENTING FUNCTION FOR SUSPENSION ON A FILTER HEAD, AND A FILTER SYSTEM

(71) Applicant: MANN+HUMMEL GmbH, Ludwigsburg (DE)

(72) Inventor: Martin Weindorf, Kornwestheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/673,161

(22) Filed: Feb. 16, 2022

(65) Prior Publication Data

US 2022/0168675 A1 Jun. 2, 2022

Related U.S. Application Data

(63) Continuation of application No. 16/837,677, filed on Apr. 1, 2020, now abandoned, which is a continuation
(Continued)

(30) Foreign Application Priority Data

Oct. 5, 2017 (DE) ..................... 10 2017 009 255.9

(51) Int. Cl.
   *B01D 29/15* (2006.01)
   *B01D 35/157* (2006.01)
   *B01D 35/153* (2006.01)

(52) U.S. Cl.
   CPC ......... *B01D 35/1573* (2013.01); *B01D 29/15* (2013.01); *B01D 35/153* (2013.01)

(58) Field of Classification Search
   CPC .. B01D 35/1573; B01D 29/15; B01D 35/153; B01D 2201/0415; B01D 2201/206; B01D 2201/291; B01D 2201/295; B01D 2201/302; B01D 2201/4015; B01D 2201/4084; B01D 29/21; B01D 35/306; B01D 36/001; F01M 1/10; F01M 11/03;
   (Continued)

(56) References Cited

U.S. PATENT DOCUMENTS

| 10,328,369 B2 | 6/2019 | Weindorf et al. |
| 10,399,020 B2 | 9/2019 | Weindorf et al. |

(Continued)

FOREIGN PATENT DOCUMENTS

| CN | 101084050 A | 12/2007 |
| DE | 19519352 A1 | 11/1996 |

(Continued)

*Primary Examiner* — Waqaas Ali

(57) ABSTRACT

A filter element for a fluid has a filter medium arranged in annular shape about a longitudinal axis to be flowed through by the fluid to be filtered radially. A coaxial outlet socket is arranged at an end of the filter element facing upwardly in filtering operation. The coaxial outlet socket has a fluid outlet channel for filtered fluid and a venting channel that vents a clean side and/or a raw side of the filter element. The venting channel coaxially surrounds the fluid outlet channel radially and extends at least in sections thereof in axial direction. A filter system is provided with a filter head that has a fluid inlet conduit, a fluid outlet conduit for filtered fluid, and a venting conduit, wherein the filter element is suspended from the filter head.

23 Claims, 5 Drawing Sheets

Related U.S. Application Data of application No. PCT/EP2018/075356, filed on Sep. 19, 2018.

(58) Field of Classification Search
CPC ... F01M 2001/105; F02M 37/22; F02M 37/32
See application file for complete search history.

(56) References Cited

U.S. PATENT DOCUMENTS

| | | |
|---|---|---|
| 10,695,701 B2 | 6/2020 | Kiedaisch et al. |
| 2008/0164188 A1 | 7/2008 | Jensen et al. |
| 2008/0179238 A1 | 7/2008 | Foucault et al. |
| 2012/0168359 A1 | 7/2012 | Marshall et al. |
| 2014/0366494 A1 | 12/2014 | Ardes |
| 2019/0046905 A1 | 2/2019 | Roy et al. |

FOREIGN PATENT DOCUMENTS

| | | | | |
|---|---|---|---|---|
| DE | 19835525 C1 | * | 10/1999 | ........... B01D 29/114 |
| DE | 202007008483 U1 | | 1/2008 | |
| DE | 102013226810 A1 | | 6/2015 | |
| WO | WO-2007010037 A1 | * | 1/2007 | ............. B01D 29/21 |

\* cited by examiner

FILTER ELEMENT WITH VENTING FUNCTION FOR SUSPENSION ON A FILTER HEAD, AND A FILTER SYSTEM

CROSS-REFERENCE TO RELATED APPLICATIONS

This application is a continuation application of U.S. patent application Ser. No. 16/837,677 having a filing date of 1 Apr. 2020, which is a continuation application of international application No. PCT/EP2018/075356 having an international filing date of 19 Sep. 2018 and designating the United States, the international application claiming a priority date of 5 Oct. 2017 based on prior filed German patent application No. 10 2017 009 255.9, the entire contents of the aforesaid US patent application, the international application and the aforesaid German patent application being incorporated herein by reference to the fullest extent permitted by the law.

BACKGROUND OF THE INVENTION

The invention concerns a filter element for a fluid, in particular fuel or oil that is provided for suspension on a filter head, with a filter medium that is arranged in an annular shape relative to the longitudinal axis of the filter element and that can be flowed through by the fluid to be filtered in a radial direction. The filter element comprises a first end disc. Moreover, the invention concerns a filter system with such a filter element.

Filter elements, in particular for fuel or oil, are designed frequently for suspended mounting on a filter head for operational use. According to one configuration, the filter elements can be embodied in this context as a filter insert that is exchangeably arrangeable in a filter housing. According to another well-established configuration, the filter elements are embodied as so-called exchangeable filters with an enclosure that represents an integral component of the filter element. The filter elements in general are expendable parts and must be exchangeable in practice in a simple and uncomplicated way even in case of tight installation conditions as they are common in the automotive sector. The requirements on filter elements increase continuously due to improvement in performance of downstream devices. For example, in addition to a sufficiently large filtration capacity and, at the same time, compact configuration, a venting possibility of the filter element during operational use is frequently required. When, for example, air collects at the clean side in the filter element in filtering operation, a pressure buildup of the filtered fluid arranged at the clean side can be made difficult or delayed. This is disadvantageous in particular when filtering fuels in motor vehicles with internal combustion engine and a so-called automatic start stop operation. Also, due to air that collects at the raw side, the fluid stream of the fluid through the filter can be impaired. In filter elements which are connected suspended and exchangeably to a filter head in operational use, venting of the filter element up to now is associated however with a high constructive expenditure on the part of the filter element as well as of the filter head provided for attaching the filter element. Such filter elements and filter heads are therefore often relatively expensive in regard to manufacture.

DE 10 2013 226 810 A1 discloses a fluid filter with venting function which has a filter housing-associated outlet socket that comprises a central vent and a venting channel arranged radially displaced thereto at a discrete circumferential position. The venting channel extends axially and opens into a fluid outlet channel wherein the venting channel is accommodated in a radially inwardly oriented depression of a circular cross section of the outlet socket. Therefore, the filter element has a simple radially sealed end disc opening as an interface.

A similar filter with venting function is also disclosed in DE 198 35 525 C1. Here, the venting channel is provided also at a discrete circumferential position, but extends in radial direction.

It is therefore the object of the invention to provide a filter system as well as an aforementioned filter element with venting function that can be manufactured in a simple and inexpensive way and enable a simple and safe mounting and demounting of the filter element.

SUMMARY OF THE INVENTION

It is therefore the object of the invention to provide a filter system as well as an aforementioned filter element with venting function that can be manufactured in a simple and inexpensive way and enable a simple and safe mounting and demounting of the filter element.

The object according to the invention is solved by a filter element comprising at its end facing upwardly in vertical direction in the filtering operation a coaxial outlet socket with a fluid outlet channel for the filtered fluid and with a venting channel for clean side and/or raw side venting of the filter element, wherein the venting channel coaxially surrounds the fluid outlet channel in radial direction and extends at least in sections thereof in axial direction.

The filter system according to the invention comprises a filter head with a fluid inlet conduit for fluid to be filtered, with a fluid outlet conduit for the filtered fluid, and with a venting conduit, and further comprises a filter element exchangeably connectable to the filter head, in particular a filter element connectable by suspension, as disclosed herein.

Further embodiments of the invention are disclosed in the dependent claims.

According to the present invention, the filter element comprises at its end that is facing upwardly in filtering operation a coaxial outlet socket which comprises a fluid outlet channel for the filtered fluid and a venting channel for venting the clean side and/or raw side of the filter element. In this context, the venting channel surrounds the fluid outlet channel coaxially in a radial direction and extends at least in sections thereof in axial direction. In this context, the venting channel is in particular embodied as an annular channel, in particular a circular ring channel, which radially surrounds the fluid outlet channel for the filtered fluid.

Due to the coaxial outlet socket, the filter element can be embodied with only one outlet-associated connecting interface for the filter head. This enables an inexpensive manufacture of the filter element and a particularly compact configuration so that the filter element can be used even in case of tight installation conditions. At the same time, mounting and demounting of the filter element at the filter head can be significantly simplified and accelerated.

According to a particularly preferred further embodiment of the invention, the coaxial outlet socket comprises at one end one or more actuating members for a valve body of the filter head which preferably extend in axial direction away from the fluid outlet channel and wherein a radial through opening for the filtered fluid is provided at least between two of the plurality of actuating members. In particular, the actuating members are arranged such at the fluid outlet channel that they are positioned at regular angular distances relative to each other and form a crown-shaped structure. The actuating member(s) is/are preferably integrally formed at the coaxial outlet socket, i.e., are formed as one piece therewith. In this way, the coaxial outlet socket can be embodied in an inexpensive way as an injection-molded part. This provides advantages in particular for the conventional mass production of filter elements. The individual actuating member or the plurality of actuating members can be embodied in particular as webs, tongues but also in an arc shape. The filter head-associated valve body is arranged downstream of a clean side outlet of the filter element. The valve body can be in particular a so-called service valve which, after removal of the filter element, closes off the clean side discharge in order to prevent emptying of the downstream fluid system.

According to a further embodiment of the invention, the venting channel at the inlet side is connected by a first capillary channel with a raw side of the filter medium which is upstream of the filter medium relative to fluid flow. In this context, the first capillary channel can be delimited in particular in radial direction inwardly by the coaxial outlet socket and in radial direction outwardly by a first wall section of the first end disc of the filter element. On the other hand, the capillary channel provides for a sufficiently large flow resistance for the fluid to be filtered so that the fluid during the operational use cannot exit or only exit in a limited quantity through the venting channel. Due to the capillary channel, on the one hand, venting of the filter element according to needs can be achieved at its raw side.

For clean side venting of the filter element, the venting channel at the inlet side can be connected by a second capillary channel with a clean side of the filter element that is arranged relative to fluid flow downstream of the filter medium. In this context, the second capillary channel is preferably delimited in radial direction, on the one hand, by an end section of a tubular support body of the filter element, in particular by a generally known central tube, and on the other hand, by a wall section of the first end disc of the filter element. In this way, additional components of the filter element may be obsolete. When the filter element comprises venting at the raw side as well as at the clean side, a compressible air volume arranged at the clean side as well as at the raw side can be quickly discharged through the venting channel from the filter element. As a whole, in this way a quicker pressure buildup of the fluid can be achieved. Due to the clean side venting, the filtered fluid therefore can be provided, immediately after start of the filtering operation, with a sufficient pressure or a volume stream sufficient for the respective application purpose. This is in particular advantageous when using the filter element as a fuel filter in motor vehicles with internal combustion engine and a so-called automatic start stop operation.

According to a preferred embodiment of the filter element, the end section of the tubular support body can engage in axial direction an annular groove of the end disc which is delimited in radial direction inwardly by a first wall section of the end disc and outwardly by a second wall section of the end disc. The first and the second wall sections in this case are advantageously connected to each other as one piece by means of a back section. In this way, the first end disc can be embodied inexpensively, for example, as an injection-molded part.

The coaxial outlet socket can be embodied according to the invention as one piece or a multi-part configuration, in particular as a two-part configuration. In the latter case, the coaxial outlet socket may comprise two coaxially arranged socket segments. The venting channel can be delimited circumferentially at both sides by the two socket segments in radial direction. At one of the two socket segments or even at both socket segments, one or a plurality of spacer elements, for example, ribs or knobs, can be integrally formed by means of which the two socket segments are supported against each other.

The filter element according to the invention may comprise a second end disc wherein the filter medium in axial direction is arranged between the first and the second end discs and is fastened at the end faces to both end discs, in particular is glued, welded to the end discs or arranged so as to be held by being embedded in the material of the two end discs.

Preferably, each of the afore explained capillary channels is connected in fluid communication by means of a siphon with the venting outlet, respectively. When the filter element comprises a capillary channel connected with the clean side and a capillary channel connected in fluid communication with the raw side, these two capillary channels advantageously can be connected in fluid communication by means of a common siphon with the venting channel. Through the siphon, in case of an interruption of the filtering operation of the filter element, as is the case, for example, when switching off an internal combustion engine of a motor vehicle operated with the fluid, an undesired retrograde introduction of air from the venting tube through the first venting channel to the clean side or through the second venting channel to the raw side of the filter element can be counteracted. Moreover, inasmuch as the first as well as the second venting channels open into the siphon, an undesired introduction of air from the raw side to the clean side, flowed through by the fluid, of the filter element can be counteracted.

Each capillary channel can be embodied, at least in sections thereof, so as to extend in a precise axial direction or so as to extend, at least in sections thereof, in a helical shape about the longitudinal axis. The spiral shape configuration of a capillary channel entails a larger length of the respective capillary channel. In this way, the respective capillary channel, with an unchanged flow resistance relative to a straight configuration of the channel, can be formed with a larger cross section that is advantageous in regard to manufacturing technology.

According to a particularly preferred further embodiment of the invention, the filter element can be surrounded by an enclosure which constitutes an integral component of the filter element. Such filter elements in practice are generally referred to as exchangeable filters. Such exchangeable filters, as needed, are exchanged and disposed of as a unit. It should be noted that the afore explained end disc, which is arranged facing upwardly in vertical direction in operational use of the filter element, may also be part of the enclosure of the filter element in this configuration. Thus, the end disk can be embodied, for example, in the form of a perforated disk with eccentrically arranged inflow openings for the fluid to be filtered. It is understood that the filter element embodied as an exchangeable filter can comprise two end discs which are arranged one after another in axial direction and face upwardly in vertical direction in operational use.

According to a further embodiment, the filter element may comprise at least a part of a bayonet connection with which the filter element can be coupled in a detachable way with at least one housing component, in particular a housing cover of a filter system. Advantageously, the bayonet connecting part is provided at an end of the filter element which is facing away from the coaxial outlet socket and, particularly preferred, faces downwardly in vertical direction in filtering operation. The bayonet connecting part at the filter element can be provided in particular at a second end disc which forms a bottom end disc. In this way, the filter element together with the housing cover can be removed with reduced soiling risk from the filter system. Moreover, advantageously the coaxial connector socket can be pulled out of the filter head for such a removal of the filter element via the housing cover.

The filter system according to the invention serves for filtering a fluid, in particular fuel or oil, and comprises a filter head with a fluid inlet conduit for the fluid to be filtered, a fluid outlet conduit for the filtered fluid, and a venting conduit for venting the filter element. At the filter head, a filter element is exchangeably connectable by suspension, as has been explained above. The filter element can be embodied as a filter insert or as an exchangeable filter.

In comparison to venting solutions in the prior art in which venting is realized through a throttle bore at the filter element between raw and clean sides (for example, in the end disc), in the solution according to the invention with separate venting channel there exists the advantage that an unfiltered bypass volume flow is not continuously generated; this increases the separating performance of the filter system.

When disconnecting the filter element from the filter head, for example, when exchanging the filter element, an undesirable back flow of filtered fluid from the fluid outlet conduit of the filter head may occur, i.e., a partial or even complete emptying of the fluid conduit, for example, fuel conduit. The fluid outlet conduit of the filter head can therefore be provided in accordance with the invention with a valve body which, by connecting the filter element to the filter head, is transferable, in particular slidable, from its closed position in which it fluid-tightly closes the fluid outlet channel into an open position in which it opens the fluid outlet channel. When the filter element is disconnected from the filter head, no fluid can flow out of the fluid outlet channel and contaminate the environment. Due to the valve body, moreover a certain protection relative to the use of impermissible or unsuitable filter elements can be achieved. The operational reliability of the filter system can thereby be increased.

According to the invention, the valve body can be transferable from its closed position into its open position exclusively against the force of gravity. However, this requires a precise fit and easy guiding of the valve body at the filter head which, as the case may be, cannot be sufficiently reliably ensured in the filter heads embodied mostly as cast or injection-molded parts. A higher degree of functional reliability can be achieved according to the invention in that the valve body is transferable against the force of a spring element from its closed position into its open position. The spring element can be in particular embodied as a pressure spring.

The filter head can comprise but also form a housing pot. The filter system comprises in this case a housing cover which is detachably fastenable at the housing pot, in particular screwable into or onto the housing pot. The housing cover forms together with the housing pot a filter housing in which the filter element can be exchangeably arranged. In this case, the filter element is thus embodied in the form of a filter insert. The housing cover and the filter element comprise preferably bayonet closure elements in order to detachably fasten the filter element by means of a bayonet closure at the housing cover. According to the invention, the housing cover can be comprised of an at least translucent material at least in sections thereof. In this way, mounting and demounting of the filter element by an operator can be monitored visually from the exterior and further simplified as a whole. Due to the cover of at least translucent material, the state of the water collecting chamber, in particular its filling level, can be monitored and the filling and/or venting process can be inspected.

BRIEF DESCRIPTION OF THE DRAWINGS

The invention will be explained in the following in more detail with an embodiment illustrated in the drawing.

DESCRIPTION OF PREFERRED EMBODIMENTS

Figure 1:
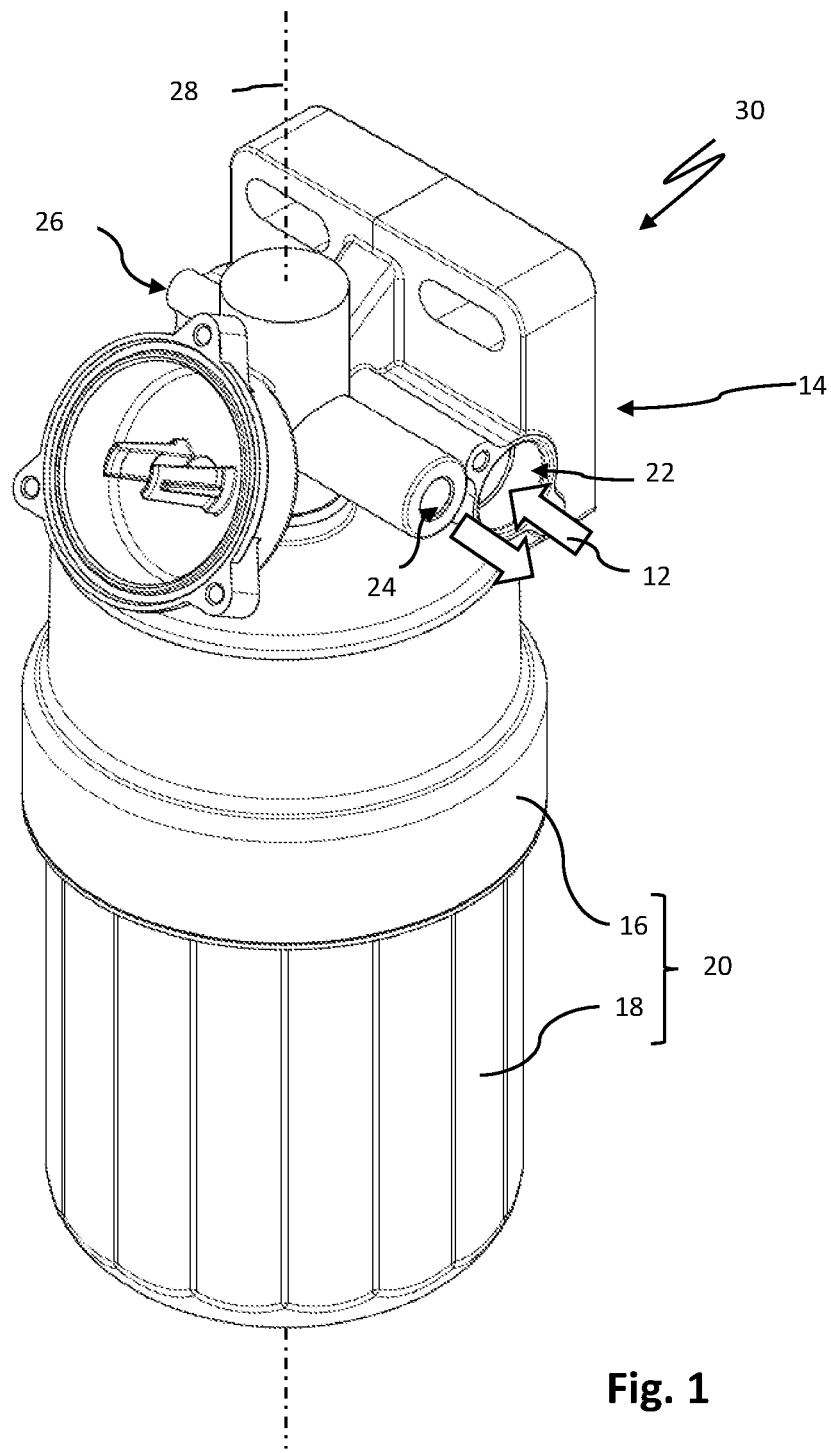
FIG. 1 shows a filter system with a filter head and a filter housing for exchangeable accommodation of a filter element, in a perspective view.
Figure 2:
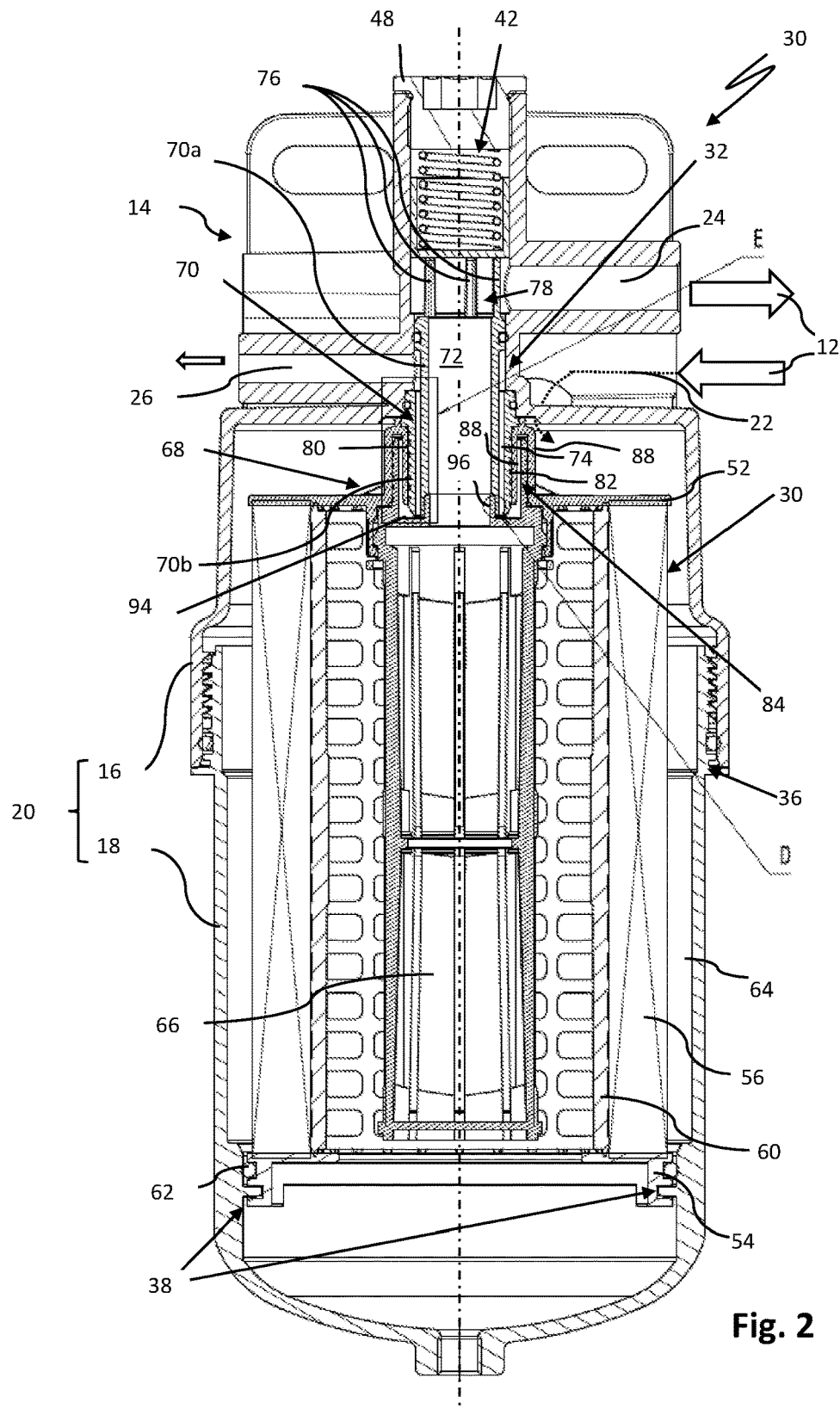
FIG. 2 shows the filter system according to FIG. 1 in a section illustration.

In FIGS. 1 and 2, a filter system 10 for filtering contaminants contained in a liquid medium or fluid 12, for example, fuel or oil, is illustrated. The filter system 10 comprises a filter head 14 with a housing pot 16 and a housing cover 18 which can be screwed onto or screwed into the housing pot 16. The housing pot 16 and the housing cover 18 thus form together a filter housing 20 that serves for accommodating a filter element embodied as a filter insert. The filter head 14 comprises according to FIG. 1 a fluid inlet conduit 22 for the fluid 12 to be filtered, a fluid outlet conduit 24 for the filtered fluid as well as a venting conduit 26 through which gas or air collected in the filter element can flow out. The longitudinal axis of the filter system 10 is identified by 28.

In FIG. 2, the filter system 10 is illustrated in a longitudinal section view. The filter element 30 is connected to the filter head 14, detachably suspended from a connecting region 32 of the filter head 14. The filter element 30 extends thus in the filtering operation in vertical direction 34 downwardly away from the filter head 14. The housing pot 16 comprises an opening 36 which points in vertical direction 34 downwardly in the operational use of the filter system and which, by means of the housing cover 18, can be closed off fluid-tightly and pressure-tightly. According to FIG. 2, the filter element 30 can be detachably coupled by means of a bayonet connection or closure 38 with the housing cover 18. In this way, the filter element 30 can be detached in a simplified way and with a minimal risk of soiling from the filter head 14 and removed from the housing pot 16 or connected to the filter head 14. When the housing cover 18 is comprised of a translucent material, the bayonet closure 38 as well as the exchange of the filter element 30 can be visually controlled and in this way further simplified as a whole.

Figure 3:
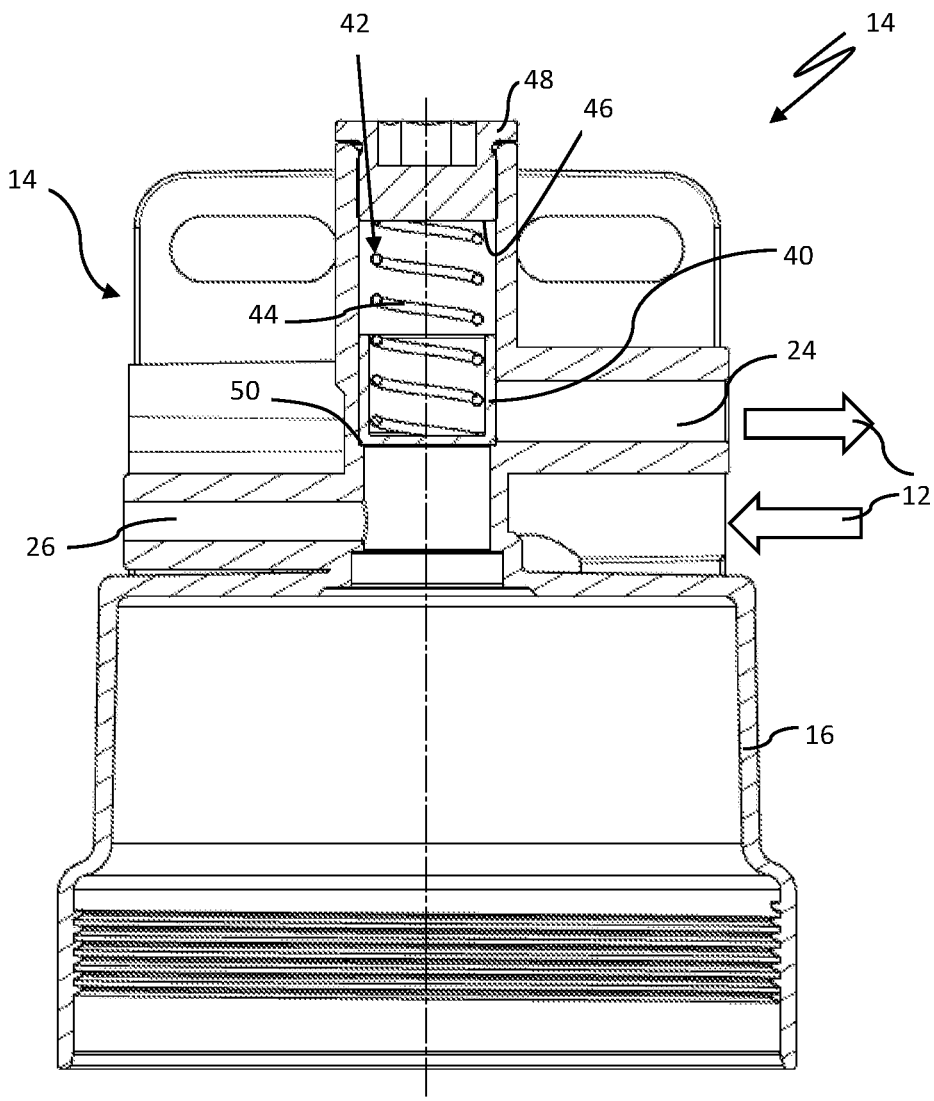
FIG. 3 shows an exposed view of the filter head of the filter system according to FIG. 1, in a section illustration.

The fluid outlet conduit 24 of the filter head 14 is provided with a valve body 40. Here, the valve body 40 is slidably supported in a valve seat 42 of the filter head 14. According to FIG. 2, the valve body 40 can be designed in a cylinder shape and can be moved against the force of a spring element 44 from a closed position illustrated in FIG. 3 into its open position illustrated in FIG. 2. An opening stop 46 of the filter head 14 can be formed, for example, by a closure screw 48 of the filter head 14. By the closure screw 48, the valve seat 42 after mounting of the valve body 40 can be closed in a simple way. At the same time, a type of revision access to the valve seat 42 can be provided in this way. A closure stop 50 of the valve body can be provided according to FIG. 3 by an annular shoulder of the filter head 14 or, as an alternative, by a spring ring which is inserted into a groove, or something similar.

According to FIG. 2, the filter element 30 comprises a top and a bottom end discs 52, 54. The end discs 52, 54 are here an integral component of the filter element 30 embodied as a filter insert. A filter medium 56 is arranged between the two end discs 52, 54. The filter medium 56 is arranged in an annular shape relative to the central or longitudinal axis of the filter element 30 and can be embodied in particular in the form of a star-shaped folded bellows. The filter medium 56 is fluid-tightly connected to the two end discs 52, 54, respectively. For example, the filter medium 56 can be glued or welded to the end discs 52, 54 or can be fluid-tightly embedded in the material of the end discs 52, 54. Here, the filter medium 56 is configured to be flowed through by the fluid 12 in the operational use (=filtering operation) in the direction of a radial direction relative to the longitudinal axis 58 of the filter element 30 from the exterior to the interior. A mesh-shaped support or central tube 60 serves for radial inner support of the filter medium 56. The central tube 60 surrounds the longitudinal axis 58 of the filter element 30. The filter medium 56 can rest against the central tube 60 directly or indirectly.

The bottom end disc 54 comprises here a preferably elastomeric sealing element 62 for a sealing seat of the filter element 30 at the housing cover 18. A raw side of the filter element 30 that is upstream of the filter medium 56 in fluid flow direction is identified at 64 and the clean side of the filter element 30 that is downstream of the filter medium in fluid flow direction is identified at 66 as a whole.

The filter element 30 comprises at its end 68, facing upwardly in vertical direction 34 in filtering operation, a coaxial outlet socket 70 with, here, a central fluid outlet channel 72 for the filtered liquid medium 12 and with a venting channel 74 for venting of the filter element 30 at the clean side and raw side. The coaxial outlet socket 70 extends in axial direction into the filter head 14. The coaxial outlet socket 70 can be seal-tightly resting externally in radial direction at the filter head 14 by means of sealing elements 62. A venting channel 74 surrounds the fluid outlet channel 72 at least in sections thereof in a radial direction relative to the longitudinal axis 58 of the filter element 30. The coaxial outlet socket 70 comprises in other words two socket segments 70a, 70b arranged to extend coaxially and embodied here together as one piece between which the venting channel 74 is formed. The coaxial outlet socket 70 is here arranged, held by clamping, in a central opening of the first (top) end disc 52 of the filter element 30 in radial press fit. The coaxial outlet socket 70 is resting circumferentially in radial direction inwardly at a central tube 60, in particular the rim section 96, and in radial direction outwardly at the top end disc 52 of the filter element 30. In addition to the central tube 60, the filter element has presently a coaxially arranged end separator arranged therein which essentially also constitutes a central tube. End separator is to be understood, for example, as a hydrophobic screen that is permeable for fuel and retains water. The end separator comprises, for example, a support structure on which, radially inwardly or outwardly, a screen fabric with a predetermined mesh width is fastened. Therefore, it can be in particular provided that a section of the end separator comprises the aforementioned rim section 96 at which the coaxial outlet socket 70 is resting radially inwardly.

According to FIG. 2, at one end of the coaxial outlet socket 70 one or a plurality of actuating members 76 for the valve body 40 of the filter head 14 are arranged. The actuating members can be formed in particular integrally at the coaxial outlet socket 70 so that the latter is embodied as an injection-molded part. The actuating member or members 76 extend preferably in axial, in particular precisely axial, direction away from the coaxial outlet socket 70. Between at least two of the plurality of actuating members 76 illustrated in the embodiment, a radial through opening 78 for the filtered fluid is formed so that the filtered fluid 12 can flow out of the fluid outlet channel of the coaxial outlet socket via the fluid outlet conduit 24 of the filter head 14.

Figure 4:
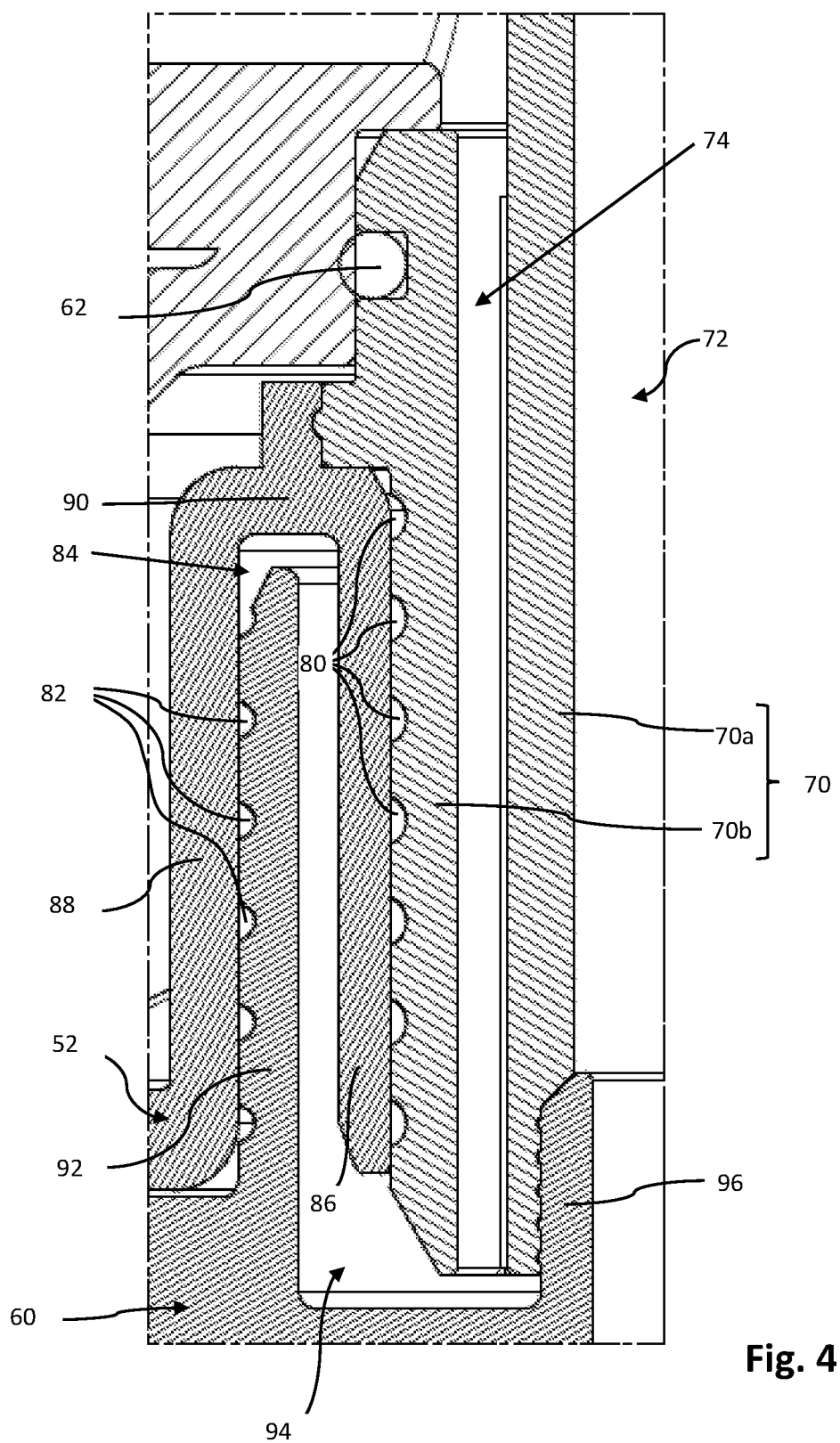
FIG. 4 shows an enlarged illustration of the detail of the filter system referenced in FIG. 1 with "E", in a section illustration.

For venting the raw side 64 of the filter element 30, a first capillary channel 80 is provided which, according to FIGS. 2 and 4, is in fluid communication with the venting channel 74. For venting the clean side 66 of the filter element 30, a second capillary channel 82 is provided which, at the outlet side, is in fluid communication with the venting channel 74.

The first or top end disc 52 of the filter element 30 comprises an annular groove 84 which is open toward the second end disc 54, i.e., in filtering operation downwardly in vertical direction 34. The annular groove 84 is delimited in radial direction inwardly by a first wall section 86 of the top end disc 52 and in radial direction outwardly by a second wall section 88 of the top end disc 52, wherein the first and the second wall sections 86, 88 are connected by a back section 90 to each other as one piece. The first capillary channel 80 is delimited in radial direction inwardly by the coaxial outlet socket 70 and in radial direction outwardly by the first wall section 86 of the end disc 52. The second capillary channel 82 is delimited in radial direction, on the one hand, by an end section 92 of the central tube 60 which engages the annular groove of the top end disc 52 and, on the other hand, by the second wall section 88 of the top end disc 52. The two capillary channels 80, 82 can be arranged so as to extend spirally about the longitudinal axis 58 of the filter element 30, respectively. Each capillary channel 80, 82 is connected in fluid communication by a siphon 94 with the venting channel 74.

The coaxial outlet socket 70 is here embodied as one piece. Alternatively, the coaxial socket can also be of a multi-part configuration. In the latter case, the socket segments 70a, 70b preferably comprise spacer elements in the form of ribs, knobs or the like, by means of which the two tubular sockets are resting against each other in sections thereof.

Figure 5:
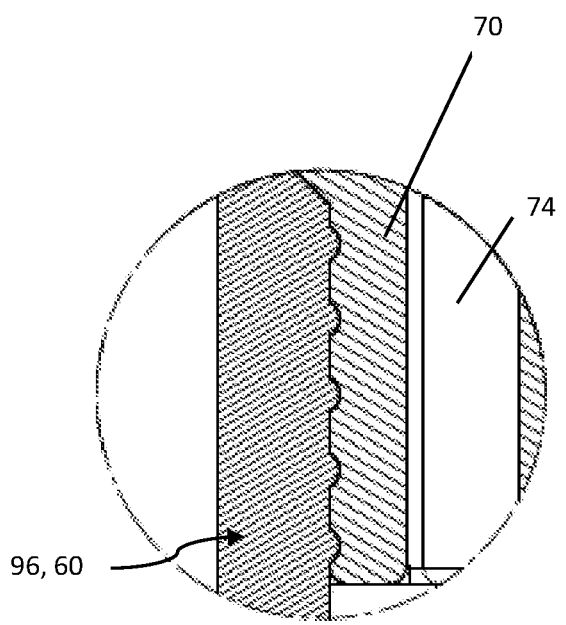
FIG. 5 shows an enlarged illustration of the detail of the filter system identified in FIG. 2 with "D", in a section illustration.

In FIG. 5, the detail of the filter system 10 that is identified in FIG. 2 by "D" is shown in enlarged illustration. The coaxial outlet socket 70 is positioned at the inner circumference circumferentially at an angled rim section 96 of the central tube 60 in a seal-tight way. The rim section 96 and the coaxial outlet socket 70 in this context can be in a mutual threaded engagement in order to secure the coaxial outlet socket 70 at the central tube 60 in a pull-resistant way. Alternatively, the rim section 96 and the coaxial outlet socket 70 can be connected by a snap connection, in particular an annular snap connection.

What is claimed is:
1. A filter element for a fluid to be filtered, the filter element configured to be suspended from a filter head, the filter element comprising:

an annular filter medium, surrounding a longitudinal axis extending through an open interior of the annular filter medium;
a first end disk fixed onto an covering a first axial end of the annular filter medium, the first end disk having a central opening;
a coaxial tubular outlet socket, coaxial to the longitudinal axis and arranged
at the first axial end of the filter element, the coaxial tubular outlet socket including:
at least one actuating member embodied as an axially extending projection projecting axially outwardly away from an axially outer end of the coaxial tubular outlet socket, the at least one actuating member configured to contact against and actuate a valve body of the filter head;
wherein the coaxial tubular outlet socket comprises a fluid outlet channel for filtered fluid and a venting channel configured to vent a clean side and/or a raw side of the filter element, wherein the venting channel coaxially surrounds the fluid outlet channel in the radial direction and extends at least in sections thereof in an axial direction of the longitudinal axis, wherein the venting channel at an inlet side is connected by a first capillary channel with a raw side of the filter medium which is upstream of the filter medium relative to fluid flow, wherein the first capillary channel is arranged at a radially outer side of the venting channel and circumferentially surrounding the venting channel and the fluid outlet channel, wherein the raw side is arranged in a fluid flow direction upstream of the filter medium, wherein the first capillary channel is delimited in the radial direction inwardly by the coaxial outlet socket and in the radial direction outwardly by a first wall section of the first end disk of the filter element.

2. The filter element according to claim 1, wherein the at least one actuating member is at least two actuating members;
wherein a radial through opening for the filtered fluid is formed between two of the at least two actuating members.

3. The filter element according to claim 1, wherein the venting channel at the inlet side is connected by a second capillary channel with the clean side of the filter element,
wherein the clean side is arranged in the fluid flow direction downstream of the filter medium.

4. The filter element according to claim 3, wherein the second capillary channel is delimited in the radial inward direction by an end section of a tubular support body of the filter element, wherein the second capillary channel is delimited radially outward by the first end disk of the filter element, wherein the tubular support body is a central tube of the filter element.

5. The filter element according to claim 4, wherein the end section of the tubular support body engages in the axial direction an annular groove of the first end disk wherein the annular groove is delimited in the radial direction inwardly by a first wall section and outwardly by a second wall section, wherein the first and second wall sections are connected to each other by a back section, and wherein the first and second wall sections and the back section are formed together as one piece.

6. The filter element according to claim 1, wherein the first and second capillary channels are connected in fluid communication to the venting channel by a siphon.

7. The filter element according to claim 1, wherein at least one of the first and second capillary channels extends at least in sections thereof in the axial direction.

8. The filter element according to claim 1, wherein at least one of the first and second capillary channels extends at least in sections thereof in a spiral shape about the longitudinal axis.

9. The filter element according to claim 2, further comprising a second disk, wherein the filter medium is arranged between the first end disk and the second end disk in the axial direction and fastened with end faces thereof to the first end disk and the second end disk.

10. The filter element according to claim 9, wherein the filter medium is glued or welded to the first end disk and the second end disk or arranged so as to be held by being embedded in a material of the first end disk and the second end disk.

11. The filter element according to claim 1, wherein the filter element is a filter insert or an enclosed exchangeable filter.

12. The filter element according to claim 1, wherein the filter element comprises
at least one bayonet connecting part of a bayonet connection configured to detachably couple the filter element with at least one housing component of a filter system.

13. The filter element according to claim 12, wherein the at least one bayonet connecting part is arranged at an end of the filter element that is facing away from the coaxial outlet socket.

14. The filter element according to claim 13, wherein the at least one bayonet connecting part points downwardly in the vertical direction in the filtering operation of the filter element.

15. A filter system for a fluid to be filtered, the filter system comprising:
a filter head comprising:
a fluid inlet conduit for the fluid to be filtered,
a fluid outlet conduit for the filtered fluid, and
a venting conduit;
a filter element, configured to be exchangeably connected to the filter head, according to claim 1.

16. The filter system according to claim 15, wherein the filter head further comprises
a valve body arranged in the fluid outlet conduit and configured to be transferred, by connecting the filter element to the filter head, from a closed position that fluid-tightly closes off the fluid outlet conduit into an open position that opens the fluid outlet conduit.

17. The filter system according to claim 16, wherein the filter head further comprises
a spring element acting on the valve body,
wherein the valve body is transferable against the force of the spring element from the closed position into the open position.

18. The filter system according to claim 16, wherein the filter head comprises
a housing pot and
the filter system further comprises
a housing cover detachably fastened to the housing pot,
wherein the housing cover and the housing pot together form a filter housing in which the filter element is arranged.

19. The filter system according to claim 18, wherein the housing cover is configured to be screwed into the housing pot or screwed onto the housing pot.

20. The filter system according to claim 18, wherein the filter element comprises
   a bayonet connecting part and is coupled detachably with the bayonet connecting part to at least one corresponding bayonet connecting part provided at the housing cover of the filter system.

21. A filter element for a fluid to be filtered, the filter element configured to be suspended from a filter head, the filter element comprising:
   an annular filter medium, surrounding a longitudinal axis extending through
   an open interior of the annular filter medium;
   an end disk fixed onto an covering a first axial end of the annular filter medium, the end disk having a central opening, the end disk forming a first U-shaped annular socket having:
   an annular second wall section formed as an axially outwardly
   projecting annular wall on the end disk, the annular second wall section surrounding the central opening of the end disk and projecting axially outwardly away from the annular filter medium; and
   a first annular wall section formed as an axially projecting annular wall arranged in an interior of the annular second wall section and surrounding
   the central opening of the end disk, wherein an axially outer portion of the annular second wall section is joined to an axially outer portion of the first annular wall section by a back section of the end disk, such the first U-shaped annular socket opens in a direction towards the annular filter medium;
   a central tube arranged in the interior of the annular filter medium, the central tube forming a second U-shaped annular socket having:
   an annular end section formed at an axial end if the central tube, projecting into and engaging into the first U-shaped annular socket of the end disk;
   and
   an angled rim section formed at the axial end if the central tube and projecting axially outwardly to contact against a radially inner side of the first annular wall section of the end disk;
   a venting channel configured to vent a clean side and/or a raw side of the
   filter element, wherein the venting channel coaxially surrounds a fluid outlet channel in the radial direction and extends at least in sections thereof in an axial direction of the longitudinal axis, wherein the venting channel at an inlet side is connected by a first capillary channel with a raw side of the filter medium which is upstream of the filter medium relative to fluid flow, wherein the first capillary channel is arranged at a radially outer side of the venting channel and circumferentially surrounding the venting channel and the fluid outlet channel, wherein the raw side is arranged in a fluid flow direction upstream of the filter medium;
   wherein the first capillary channel is delimited in the radial direction inwardly by the coaxial outlet socket and in the radial direction outwardly by a first wall section of the first end disk of the filter element.

22. The filter element according to claim 21, wherein a second capillary venting channel is formed in the first U-shaped annular socket of the end disk by a groove formed into either the annular second wall section of the end disk or into the annular end section of the central tube;
   a coaxial tubular outlet socket engaging onto the angled rim section of the central tube, the coaxial tubular outlet socket and the angled rim section of the
   central tube forming a central fluid outlet channel;
   a first capillary venting channel formed between the coaxial tubular outlet socket and the first annular wall section of the top end disk by a groove formed into either the coaxial tubular outlet socket or the first annular wall section of the end disk.

23. The filter element according to claim 22, wherein
   the groove forming the first capillary venting channel and/or the second capillary venting channel is a spiral groove, extending as a spiral about the longitudinal axis.

\* \* \* \* \*